United States Patent [19]

Stanford

[11] 4,213,540
[45] Jul. 22, 1980

[54] BREAD BOX DISPENSER

[76] Inventor: Louise A. Stanford, 2009 Brighton Rd., Avondale, Md. 20018

[21] Appl. No.: 929,238

[22] Filed: Jul. 31, 1978

[51] Int. Cl.² .............................................. B65H 3/22
[52] U.S. Cl. ................................. 221/150 R; 221/251
[58] Field of Search .................. 221/150 R, 227, 226, 221/251, 292, 293, 298

[56] References Cited

U.S. PATENT DOCUMENTS

| | | | |
|---|---|---|---|
| 2,480,339 | 8/1949 | Rifkin | 221/150 R |
| 2,979,229 | 4/1961 | Reeder et al. | 221/293 X |
| 3,379,343 | 4/1968 | Kirkland | 221/251 |

*Primary Examiner*—Stanley H. Tollberg
*Attorney, Agent, or Firm*—Blair, Brown & Kreten

[57] ABSTRACT

Disclosed herein is a bread box for dispensing bread by the slice, which includes a refrigeration unit within the container, and in one embodiment a remote control mechanism for dispensing one slice of bread at a time upon command. In another embodiment a manual mechanism is provided for retaining the slice of bread adjacent to that one which is to be dispensed and then a sequential operation follows in which this retained piece of bread is released in order to be ready for dispensing. The structure includes pins, retractably set within the second piece of bread which are removeable and disengageable upon recycling the opening and closing of the door operation. The bread is urged to the door by means of spring in the preferred embodiment.

1 Claim, 4 Drawing Figures

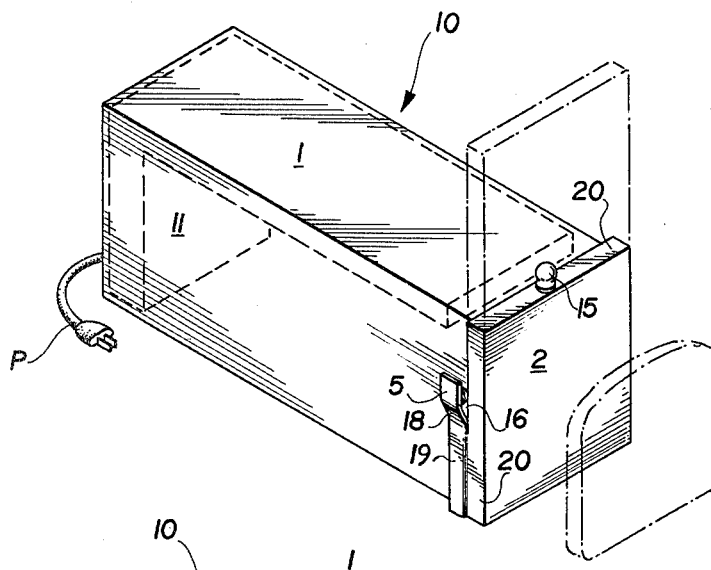
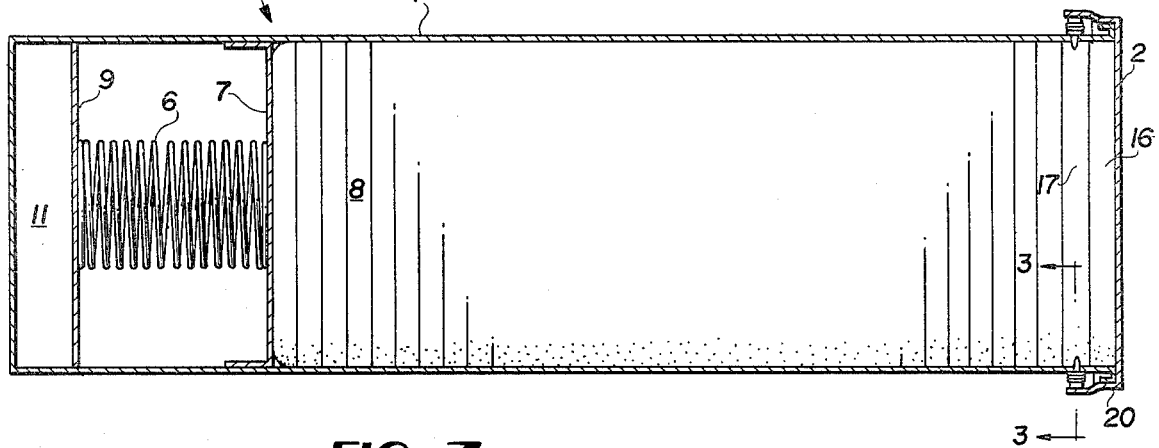
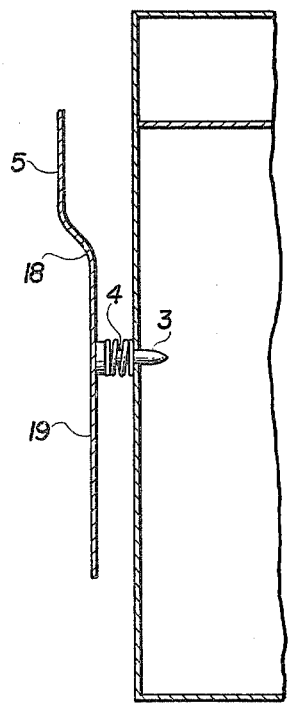

BREAD BOX DISPENSER

BACKGROUND OF THE INVENTION

Various attempts at providing a dispenser particularly suitable for dispensing bread or similarly stacked objects have existed for some time in prior art. The devices illustrative of this type of dispensing mechanism include the following five patents, Nos. 1,973,867, 2,226,626, 2,626,575, 3,298,568 and 3,558,006. Of these five, perhaps the patents to Cook, LeBrocq and Mann most closely exemplify the preferred techniques associated with such type dispensing in that they all rely upon the effect of gravity in order to dispense the articles and the doors disposed along the lower face of the dispensers are provided with in one instance a lip to assure dispensing for only one slice of bread, a rotateable valve which increases the likelihood that only one slice of bread will be dispensed without carrying along a portion of the second successive piece, and in the cracker dispenser a vertical wall terminates in a curve that extends horizontally outward to guide the crackers outwardly.

These dispensers are deficient in that in the first case, the likelihood of dispensing bread without jamming the machine (since bread may or may not be a semi-rigid object) is not guaranteed by the withholding mechanism that constrains the piece of bread next to the one being dispensed. In the second case the valve structure does not assure that the second piece of bread will not become caught within the dispensing orifice, and in the third case the freshness of the cracker or bread can not be maintained for any extended period of time.

Furthermore, these dispensing devices rely primarily upon a somewhat quick turnover rate to assure that the last slice of bread will approximately have the same freshness as the first, since the sealing means to exclude air from the environment is merely concidental in their structures.

SUMMARY OF THE INVENTION

Accordingly, an object of this inventon contemplates providing a bread box free of the deficiencies noted above.

A further object of this invention specifically contemplates providing refrigeration means integral with the bread box dispenser so as to assure the freshness of the bread being dispensed.

Another object of this invention contemplates providing means to assure that only one slice of bread will be dispensed at a time and that the slice of bread waiting to be dispensed will not become caught within the extraction mechanism.

A further object contemplates providing a close fit along the access so as to increase the likelihood that the bread thus kept will be maintained in a fresh condition.

Another object contemplates dispensing remotely.

These and other objects will be made manifest and considered in the following detailed specification and claims.

BRIEF DESCRIPTION OF THE DRAWINGS

FIG. 1 is an isometric view of one embodiment of the present invention with certain structural parts done in phantom;

FIG. 2 is a top sectional view thereof;

FIG. 3 is a sectional view taken along lines 3—3 of FIG. 2; and

FIG. 4 is an isometric view of an alternative embodiment.

BRIEF DESCRIPTION OF THE PREFERRED EMBODIMENTS

Referring now to the drawings in detail wherein like reference characters refer to like parts through out the drawings, reference 10 is generally directed to the bread box according to the present invention.

A bread box is generally comprised of a hollow rectangulid having five closed sides and a sixth open side which provides for a door. Disposed within the bread box 10 is an L-shaped refrigeration unit 11 electrically actuable through plug P which maintains the bread in an optimal environment.

The mechanism by which the bread is continuously urged forward in all the embodiments includes a spring 6 best seen in FIG. 2 disposed between a pair of vertically spaced apart walls 9 and 7 in such a manner that wall 7 is moveable toward the door under the spring biasing and the spring tension is selected such that the resistance between the spring and a loaf of bread 8 will assure that the bread is neither damaged but is successively urged towards the door 2 as a function of use.

Towards that end, the door 2 is provided with a lip 20 which extends around three sides of the bread box body 10 and has a generally open sided rectangular configuration adapted to overlie the mouth of the bread box. Connected to this flanged element 20 is an outwardly extending further lip 19 having an outwardly tapered portion 18 terminating in a second vertically upstanding portion 5. This lip 19 is so spaced as to register with the second slice of bread within the box and it will be seen therefore that when handle 15 is pulled in a vertically upward direction a pin element 3 which is biased by spring 4 will be in such a position that the spike end 3 of the pointed element extends into the second piece of bread as the door is being raised since the pin 3 originally disposed in the upper portion 5 above the bent area 18 did not coact with the bread. However, as the door 2 is being pulled upwardly the pin 3 is forced to register and enter into the bread thereby holding the same within the box. For the sake of simplicity, merely two such pins have been shown, but it is clear that a plurality of such retention devices could have been used.

FIG. 4 contemplates an alternative embodiment to that seen in FIGS. 1 through 3, and the structural similarities will first be discussed, since these aspects of the invention are common to both. The unit of FIG. 4 is similarly electrically powered as by plug P and shares the same rectanguloid configuration 10 as the above discussed embodiment and also uses the L-shaped refrigeration unit not shown in this drawing.

The main differences that this unit has over the initial FIGS. 1 through 3 drawings however, is that the door 2 in this case is now pivoted at its lower extremity, and the pins seen in FIG. 3 are electrically energized for example as by solenoid relays 14. Further, however, the latch mechanism 13 is operated by either a push button 21 on a latch mechanism 12 and 13 or by remote control so that upon energization of this circuit, the latch 13 will open and kick the door outwardly exposing a piece of bread. It is to be noted that the pin members are activated automatically by the solenoids 14 with the latch and will still retain the second slice of bread until the door is closed manually when the circuitry automatically resets itself so as to be ready for another remote control or push button command.

Having thus described the invention it will be apparent that numerous structural modifications are contemplated as being a part of this invention not only as specified here and above, but as defined by the claims.

What is claimed is:

1. A bread box for dispensing bread by the slice comprising a container, refrigeration means disposed within said container, first biasing means for translating the bread in a substantially horizontal direction to an outlet on the dispenser box, and latch means disposed on said outlet of the dispenser whereby one slice of bread can be dispensed at a time while the next slice of bread in line is retained by means to prevent its removal in which means to prevent the next slice of bread from being removed includes at least one pin element adapted to engage said slice of bread and second biasing means to allow said pin to be removed said means to prevent removal further includes a door having a outwardly rectangularly flanged area, a lip extending beyond two sides of said flanged area having a narrow outwardly extending portion, and a vertically upstanding wider portion whereby when said door is pulled vertically upward, the pin and second biasing means ride into the narrower portion of said lip and constrain the second slice of bread by pressing said pin element into the bread.

* * * * *